United States Patent
Brassac et al.

(10) Patent No.: US 12,074,759 B2
(45) Date of Patent: Aug. 27, 2024

(54) MANAGEMENT OF CONFIGURATION DATA FOR A MULTI-MODULE SERVER

(71) Applicant: BULL SAS, Les Clayes-sous-Bois (FR)

(72) Inventors: Claude Brassac, Saint Germain en Laye (FR); Michel Brunet, Denee (FR); Amine Rebai, Phoenix, AZ (US)

(73) Assignee: BULL SAS, Les Clayes-sous-Bois (FR)

( * ) Notice: Subject to any disclaimer, the term of this patent is extended or adjusted under 35 U.S.C. 154(b) by 282 days.

(21) Appl. No.: 16/978,916

(22) PCT Filed: Mar. 12, 2019

(86) PCT No.: PCT/FR2019/050533
§ 371 (c)(1),
(2) Date: Sep. 8, 2020

(87) PCT Pub. No.: WO2019/175499
PCT Pub. Date: Sep. 19, 2019

(65) Prior Publication Data
US 2021/0051064 A1   Feb. 18, 2021

(30) Foreign Application Priority Data

Mar. 12, 2018   (FR) .................................... 1852116

(51) Int. Cl.
*H04L 41/0816* (2022.01)
*G06F 9/4401* (2018.01)

(52) U.S. Cl.
CPC ........ *H04L 41/0816* (2013.01); *G06F 9/4405* (2013.01)

(58) Field of Classification Search
CPC ..... H04L 41/08; H04L 41/24; H04L 41/0816; G06F 9/4403; G06F 9/4405; G06F 11/0751
See application file for complete search history.

(56) References Cited

U.S. PATENT DOCUMENTS

| 9,122,501 | B1* | 9/2015 | Hsu | G06F 9/4405 |
| 2007/0169106 | A1* | 7/2007 | Douglas | G06F 8/61 |
| | | | | 717/173 |

(Continued)

FOREIGN PATENT DOCUMENTS

EP   2 998 877 A2   3/2016

OTHER PUBLICATIONS

Chen, H. et al., "Design and Implementation of Cloud Server Remote Management System Based on IMPI Protocol," 2015 IEEE 12th Intl Conf on Ubiquitous Intelligence and Computing and 2015 IEEE 12th Intl Conf on Autonomic and Trusted Computing and 2015 IEEE 15th Intl Conf on Scalable Computing and Communications and Its Associated Workshops (UIC-ATC-ScalCom), dated Aug. 10, 2015, DOI: 10.1109/UIC-ATC-ScalCom-CBDCom-IoP. 2015.266, pp. 1475-1478.

(Continued)

*Primary Examiner* — Viet D Vu
(74) *Attorney, Agent, or Firm* — MEAGHER EMANUEL LAKS GOLDBERG & LIAO, LLP

(57) ABSTRACT

Disclosed is a server including a plurality of information processing modules so as to form a unified platform for an operating system deployed on the server, each module having an elementary software, BIOS, provided to use configuration data when the module is started up, the server also being provided to allow at least one configuration datum to be modified, and being characterized in that it further includes a management controller, BMC, provided to store configuration data in an associated memory, and to transmit, when the at least one configuration datum is modified, such data to management controllers associated with the other modules, and in that the elementary software is provided to recover the configuration data from the management controller when the module is started up.

13 Claims, 1 Drawing Sheet

(56) References Cited

U.S. PATENT DOCUMENTS

| | | | |
|---|---|---|---|
| 2007/0186086 A1* | 8/2007 | Lambert | G06F 8/65 |
| | | | 713/1 |
| 2010/0100612 A1* | 4/2010 | Almeida | H04L 67/108 |
| | | | 709/223 |
| 2010/0332890 A1* | 12/2010 | Chen | G06F 9/542 |
| | | | 714/2 |
| 2013/0198504 A1 | 8/2013 | Arnold et al. | |
| 2014/0123121 A1 | 5/2014 | Chiu et al. | |
| 2014/0282045 A1* | 9/2014 | Ayanam | G06F 3/0488 |
| | | | 715/740 |
| 2015/0154092 A1* | 6/2015 | Chen | G06F 9/4401 |
| | | | 713/2 |
| 2015/0331694 A1* | 11/2015 | Balakrishnan | G06F 9/4401 |
| | | | 713/2 |
| 2016/0062936 A1 | 3/2016 | Brassac et al. | |
| 2016/0283513 A1* | 9/2016 | Antony | G06F 8/71 |

OTHER PUBLICATIONS

Fang, Y-C. et al., "Managing and Monitoring—High-Performance Computing Clusters with IPMI," dated Oct. 1, 2004, Retrieved from the Internet URL: https: //pdfs.semanticscholar.org/3a93/1d8ce6be1593a34ff9c9c83801aba1435b0f.pdf, pp. 58-63.

"Intel Ultra Path Interconnect," Wikipedia, Retrieved from the Internet URL: https://en.wikipedia.org/wiki/Intel_UltraPath_Interconnect, on Aug. 18, 2020, p. 1-1.

"Intelligent Platform Management Interface Specification v2.0," Document Revision 1.1, dated Oct. 2, 2013, Retrieved from the Internet URL: https://www.intel.com/content/www/us/en/servers/ipmi/ipmi-home.html, pp. 1-644.

International Search Report of the International Searching Authority for PCT/FR2019/050533 with mailing date of May 2, 2019.

English translation of International Search Report of the International Searching Authority for PCT/FR2019/050533 with mailing date of May 2, 2019.

* cited by examiner

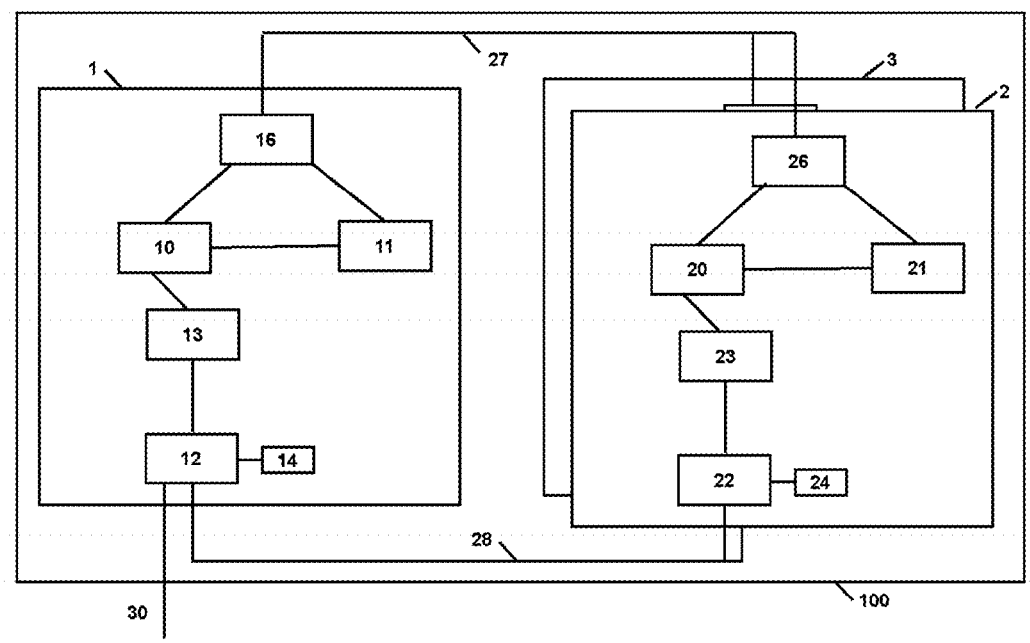

MANAGEMENT OF CONFIGURATION DATA FOR A MULTI-MODULE SERVER

FIELD OF THE INVENTION

The present invention relates to the management of configuration data in an information processing system. In particular, the invention makes it possible to improve this management in the context of a multiprocessor system composed of a plurality of modules.

CONTEXT OF THE INVENTION

A server, or more generally any information processing system, comprises an elemental software, BIOS ("Basic Input-Output System"), stored in a flash-type memory or NVRAM ("Non-Volatile RAM") which enables in particular the configuration of certain aspects of the server during start-up thereof, based on configuration data, typically also stored in this NVRAM memory.

During start-up, the user of the server generally has the possibility of accessing a man-machine interface enabling them to modify all or part of this configuration data.

However, some servers are multi-modules, i.e. composed of a plurality of interconnected modules so as to only form a single platform for an operating system deployed on the server. Such a multi-module server is in particular described in patent application EP2998877.

Each of the modules necessarily has its own elemental BIOS software enabling start-up thereof. However, in so far as the set of modules must be considered a single platform, the uniqueness and coherence of the configuration data for all the modules is of utmost importance, in order to ensure proper start-up and correct functioning of the server.

Furthermore, existing tools making it possible to access the content of the NVRAM memory do not make it possible to access the configuration data stored in the memory of the "master" module at the time of access. Thus, if a configuration parameter is modified, the coherence between the different modules will be lost.

SUMMARY OF THE INVENTION

The aim of the present invention is to make it possible to achieve such coherence of configuration data between the set of modules, so that each one may start up with the same configuration data, and also to enable a user to easily modify all or part of the configuration data while retaining this coherence between the set of modules.

To this end, the present invention proposes a server comprising a plurality of information processing modules so as to form a unified platform for an operating system deployed on said server, each module having an elementary software, BIOS, provided to use configuration data when said module is started up, said server also being provided to allow at least one configuration datum to be modified, and being characterized in that it further comprises a management controller, BMC, provided to store configuration data in an associated memory and to transmit, when the at least one configuration datum is modified, said data to management controllers associated with the other modules of said plurality, and in that said elementary software is provided to recover the configuration data from said management controller when said module is started up.

According to preferred embodiments, the invention comprises one or more of the following features which may be used separately or in partial combination with one another, or in full combination with one another:

said management controllers of said plurality of modules can communicate by means of a network internal to said server;

said management controllers transmit said configuration data in messages in accordance with the IPMI standard;

said associated memories are SD cards;

Another aspect of the invention relates to a method for managing configuration data of an information processing module belonging to a server comprising a plurality of modules connected so as to form a unified platform for an operating system deployed on said server, said data being used for the start-up of said module by the elementary software, BIOS, of said module, and said method comprising:

the modification of at least one configuration datum;

the transmission of said at least one configuration datum to a management controller of the module, BMC, the storage, by said controller, BMC, of said at least one configuration datum in an associated memory, and the transmission of said datum to management controllers associated with the other modules of said plurality.

According to preferred embodiments, the method according to the invention comprises one or more of the following features, which may be used separately or in partial combination with one another or in full combination with one another:

said at least one configuration datum is modified during start-up of said module by said elementary software, by displaying a man-machine interface on a terminal connected to said server enabling a user to visualize and perform modifications on configuration data;

said at least one configuration datum is modified by means of an external management interface of said controller;

the transmissions of said at least one configuration datum to said management controller, BMC, are in accordance with the IPMI interface;

Another aspect of the invention relates to a method for starting up an information processing module belonging to a server comprising a plurality of modules connected so as to form a unified platform for an operating system deployed on said server, comprising:

sending, by said elementary software, BIOS, of said module, a request to a management controller, BMC, of said module, recovering configuration data by said controller in an associated memory, and transmitting said data to said elementary software in response to said request, starting up said module based on said configuration data.

Another aspect of the invention relates to a computer program comprising program instructions for the execution of a method as described previously, when said program is executed on a processor.

Other characteristics and benefits of the invention will become apparent upon reading the following description of a preferred embodiment of the invention, given as an example with reference to the attached drawings.

BRIEF DESCRIPTION OF THE DRAWINGS

FIG. 1 schematically shows an example of multi-module server according to one embodiment of the invention.

DETAILED DESCRIPTION OF THE INVENTION

FIG. 1 shows an embodiment of a server 100 comprising a plurality of modules 1, 2, 3. Three modules are shown in the FIGURE, but in practice a larger number of modules may be installed, typically 8 or 16. The modules may be identical or comprise sufficiently minimal differences for the plurality of modules to be able to be considered as a single platform by an operating system deployed on the server 100.

Each of the modules may comprise several processors 10, 11, 20, 21 or CPU (Central Processing Unit). In the example of FIG. 1, each module is "dual socket", i.e. composed of two processors.

The processors of the same module are interconnected with one another via a QPI (QuickPath Interconnect) or UPI (Ultra Path Interconnect) link, etc.

This type of link, known per se, makes it possible to interconnect processors sharing the same address space. They are for example described in the open-source encyclopedia Wikipedia: https://en.wikipedia.org/wiki/Intel_UltraPath_Interconnect Each of the modules also comprises a memory 13, 23 making it possible to store the elementary software BIOS. The two processors 10, 11, 20, 21 of the same module therefore share the same elementary software BIOS and are synchronized in order to access same.

During the start-up of a module, the elementary software stored in the memory 13, 23 is triggered and uses configuration data to correctly start up the module.

Each of the modules also comprises a communication element 16, 26 making it possible to establish a link between the processors 10, 11, 20, 21 of the set of modules.

The interconnection 27 between the communication elements 16, 26 typically is a high-speed link or set of links.

This may for example be an XQPI (eXtended QuickPath Interconnect) or SCI (Scalable Coherent Interconnect) network, which is a commercially available solution developed by Bull.

The communication elements 16, 26 may be BCSs (Bull Coherence Switch) or any other commercially available XNC (eXternal Node Controller). These communication elements, in collaboration with the interconnection 27, make it possible to obtain the desired memory and cache coherence, while achieving good performance in terms of throughput and latency.

Other solutions also are possible.

Thus, this interconnection 27 and the communication elements 16, 26 make it possible to give the operating system, and therefore the applications deployed on the server, the view of a single memory for the set of modules 1, 2, 3. In other words, from the perspective of this operating system and applications, the modules 1, 2, 3 form a single platform; the fact that the server is composed of a plurality of modules is functionally transparent for them.

Moreover, each module comprises a management controller 12, 22 or BMC (Baseboard Management Controller). The management controller 12, 22 is mainly a specialized processor making it possible to monitor and control the physical state of the respective module 1, 2 to which it belongs.

According to one embodiment, the management controllers 12, 22 are interconnected by a network 28 in order to exchange monitoring and control information, such that each of the management controllers has a global view of the set of modules of the server 100. Thus, an external equipment management application may query any management controller 12, 22 and be able to monitor and control the server 100, taking into account the set of modules composing it.

Typically, the management controller can monitor and optionally control different elements embedded within the module: temperature sensors, fans, moisture sensors, etc. Also typically, this management controller is in accordance with the IPMI (Intelligent Platform Management Interface) standard. An external equipment management application may interact with the management controller 12, 22 by means of an access, typically an Ethernet access, 30 and of commands in accordance with the IPMI standard.

The specifications of the IPMI standard are in particular available on Intel's website.

https://www.intel.com/content/www/us/en/servers/ipmi/ipmi-home.html

According to the invention, the management controllers BMCs 12, 22, store the configuration data in respective memories 14, 24, associated therewith. In other words, the configuration data is not stored in the NVRAM memory 13, 23 associated with the elementary software BIOS, but "offset" on a discrete, heterogeneous element, relative to the typical architecture of a multiprocessor system.

This associated memory may be an SD (Secure Digital) card, for example, the reader of which is directly connected to and driven by the corresponding management controller.

In addition, the management controllers 12, 22 are provided to transmit this data to the management controllers of the other modules of the server, when one or more configuration data are modified. The management controllers then store the received data within the respective memories 14, 24 thereof. Thus, the contents of the memories (SD cards) associated with each BMC is continually synchronized and coherent.

The configuration data is transmitted between the management controllers of the different modules constituting a server via the network 28. This network can be an Ethernet network.

Preferably, the configuration data is transmitted according to the IPMI standard. The intelligent platform management interface, IPMI, is a set of specifications of interfaces between the BMC, the BIOS and any other remote software or software being executed on the server 100.

IPMI is therefore not provided for exchanges between BMCs, nor for transmitting configuration data belonging to the BIOS. These specifications have therefore been extended in order to be able to address the problems of the present invention.

The configuration data may be modified in two main ways.

According to a first way, one or more configuration data are modified during start-up of said module by the elementary software BIOS, by displaying a man-machine interface on a terminal connected to the server, which enables a user to visualize and perform modifications on configuration data. Conventionally, the user can modify values by navigating between several pages of the man-machine interface. When they choose to save their choices, the elementary software BIOS transmits a command to the management controller of its module. This command contains modified configuration data and may be in accordance with the IPMI standard.

According to a second way, one or more configuration data are modified by means of an external management interface 30 of the management controller. An external application may transmit IPMI commands to the management controller 12, 22 in order to modify one or more configuration data.

It should be noted that the elementary software BIOS is not involved in this second way of working.

In both situations, the management module 12, 22 saves the modified configuration data in the associated memory 14, 24, and transmits this modified data to the other management modules via the network 28.

This replication between BMCs makes it possible to ensure the uniqueness and coherence of the configuration data between all the modules of the server and thus to be able to correctly initialize the server during start-up thereof.

During start-up of the server 100, the elementary software BIOS of each module emits a request to the management controller of its respective module. Upon receipt, the latter recovers the set of configuration data from the associated memory, then transmits it to the elementary software in response to its request. Both the request and the response can be in accordance with the IPMI standard.

The module can then start up based on this configuration data.

It is thus understood that, since the configuration data are coherent over the set of modules, the latter start up according to the same configuration. Hence, from the perspective of an application, toggling from one module to another will be entirely transparent, and no malfunction of the server will be induced by configuration inconsistencies between the different modules constituting the server.

In the same manner as for the modification, the configuration data may be consulted in at least two main ways.

According to a first way, when the module is started up, the elementary software BIOS transmits a request to the management controller of its module in order to recover the configuration data stored in its associated memory. It can then display the recovered data via a man-machine interface on a terminal connected to the server. The user can then visualize the configuration data, in particular by navigating between several pages of the man-machine interface. The commands exchanged between the elementary software and the management controller can be in accordance with the IPMI standard.

According to a second way, an external application can transmit IPMI commands to the management controller 12, 22 via the external management interface 30 in order to recover the configuration data. It may transmit a command with the aim of recovering a particular configuration datum, by indicating its identifier, and by recovering the value thereof in response. It may also transmit a command with the aim of recovering the set of configuration data.

It should be noted that the elementary software BIOS is not involved in this second way of working.

Once again, the replication between the BMCs enables the user to visualize the configuration data of the active module, while having the guarantee that the same configuration values have also been established for the other modules of the server.

A user may wish to reset the configuration data to their default value. This may also be carried out in two ways According to a first way, the user may access a "reinitialization" option accessible on the man-machine interface triggered by the software element BIOS. According to a second way, an external application may transmit a command (IPMI for example) to the management controller via the external management interface.

In both cases, when the management controller receives a reinitialization command, it modifies the configuration data to reset it to its initial values. To this end, it may for example delete a current file containing current configuration data values and copy, in its place, a "factory" file containing the initial values of the set of configuration data, as set by the manufacturer of the module.

These actions are replicated on the other modules using the network 28.

As mentioned previously, the elementary software BIOS of the modules 1, 2, 3 is modified in order that the accesses to the NVRAM memory, where the configuration data is normally stored, be replaced by an interface (for example IPMI) to the management controller BSC.

The management controller BMC is also modified to handle new commands originating from the elementary software BIOS or from an external application.

Naturally, this invention is not limited to the examples and embodiments described and shown, but rather is subject to numerous variations accessible to the person skilled in the art.

The invention claimed is:

1. A server (100) comprising a plurality of information processing modules (1, 2, 3) so as to form a unified platform for an operating system deployed on said server, each module having an elementary software, BIOS, provided to use configuration data when said module is started up, said server further being provided to allow at least one configuration datum to be modified, wherein each module further comprises a management controller, BMC (12, 22), provided to store said configuration data in an associated memory (14, 24) and to transmit, when the at least one configuration datum is modified, said at least one configuration datum to management controllers associated with the other modules of said plurality, wherein said management controller is provided to transmit said at least one configuration datum to said management controllers associated with the other modules of said plurality in messages in accordance with the IPMI standard and via a network (28) internal to said server (100) by means of which said plurality of modules can communicate, wherein said management controllers associated with the other modules of said plurality are provided to store the received at least one configuration datum in their associated memory, wherein said associated memory (14, 24) of said management controller is a non-volatile memory being discrete and heterogeneous from another non-volatile memory (13, 23) storing said elemental software, and controlled by said management controller, wherein said elementary software is provided to recover said configuration data from the associated memory of said management controller, when said module is started up, and wherein said elementary software is configured to modify said at least one configuration datum during start-up of said module by said elementary software by displaying a man-machine interface to enable a user to visualize and perform modifications on said at least one configuration datum.

2. The server (100) according to claim 1, wherein said associated memories are SD cards.

3. A method for managing configuration data of an information processing module belonging to a server comprising a plurality of information processing modules connected so as to form a unified platform for an operating system deployed on said server, each module of the plurality of information processing modules comprising a management controller, BMC, said configuration data being used for the start-up of said information processing module by the elementary software, BIOS, of said information processing module, and said method comprising:

a modification of at least one configuration datum, wherein said at least one configuration datum is modified during start-up of said module by said elementary software by displaying a man-machine interface to enable a user to visualize and perform modifications on said at least one configuration datum;

a transmission of said at least one configuration datum to a management controller of the information processing module, BMC, in a message in accordance with the IPMI standard, a storage, by said controller, BMC, of said at least one configuration datum in an associated memory, wherein said associated memory is discrete and heterogeneous from another non-volatile memory storing said elemental software, and controlled by said management controller, and the transmission of said at least one configuration datum to management controllers associated with the other modules of said plurality in a message in accordance with the IPMI standard and via an internal network (28) by means of which the information processing modules of said plurality can communicate, the storage, by said management controllers associated with the other modules of said plurality of the at least one configuration datum in an associated memory.

4. The server (100) according to claim 1, wherein said at least one configuration datum is modified by means of an external management interface (30) of said controller.

5. The method according to claim 3, wherein the transmissions of said at least one configuration datum to said management controller, BMC, are in accordance with the IPMI interface.

6. The method according to claim 3, wherein said method further comprises:

in response to receiving from said elementary software, BIOS, of said module, a request to a management controller, BMC, of said module, recovering configuration data by said controller in an associated memory, and transmitting said data to said elementary software, said elementary software being provided to start up said information processing module based on said configuration data.

7. A non-transitory computer-readable medium on which is stored a computer program comprising program instructions for the execution of a method according to claim 3, when said program is executed on a processor.

8. The server (100) according to claim 1, wherein said management controllers transmit said configuration data in messages in accordance with the IPMI standard.

9. The server (100) according to claim 1, wherein said associated memories are SD cards.

10. The server (100) according to claim 1, wherein said at least one configuration datum is modified by means of an external management interface (30) of said controller.

11. The server (100) according to claim 2, wherein said at least one configuration datum is modified by means of an external management interface (30) of said controller.

12. The method according to claim 3, wherein said at least one configuration datum is modified by means of an external management interface (30) of said controller.

13. The server (100) according to claim 1, wherein the transmissions of said at least one configuration datum to said management controller, BMC, are in accordance with the IPMI interface.

* * * * *